(12) United States Patent
Scott et al.

(10) Patent No.: US 10,131,964 B2
(45) Date of Patent: Nov. 20, 2018

(54) IRON-CARBON-MANGANESE AUSTENITIC STEEL SHEET

(71) Applicants: ARCELORMITTAL FRANCE, Saint Denis (FR); THYSSENKRUPP STEEL EUROPE AG, Duisburg (DE)

(72) Inventors: Colin Scott, Montigny les Metz (FR); Philippe Cugy, Thionville (FR); Christian Allely, Metz (FR)

(73) Assignees: ARCELORMITTAL FRANCE, Saint Denis (FR); THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/672,906

(22) Filed: Mar. 30, 2015

(65) Prior Publication Data

US 2016/0010187 A1    Jan. 14, 2016

Related U.S. Application Data

(62) Division of application No. 12/373,152, filed as application No. PCT/IB2007/001866 on Jul. 6, 2007, now Pat. No. 9,200,355.

(30) Foreign Application Priority Data

Jul. 11, 2006 (EP) .................................. 06291136

(51) Int. Cl.

| | | |
|---|---|---|
| *C22C 38/02* | (2006.01) | |
| *C21D 9/46* | (2006.01) | |
| *C22C 38/04* | (2006.01) | |
| *C22C 38/08* | (2006.01) | |
| *C22C 38/12* | (2006.01) | |
| *C22C 38/16* | (2006.01) | |
| *C23C 2/02* | (2006.01) | |
| *C23C 2/06* | (2006.01) | |
| *C23C 2/28* | (2006.01) | |
| *C23C 28/02* | (2006.01) | |
| *C21D 1/26* | (2006.01) | |
| *C21D 1/42* | (2006.01) | |
| *C21D 1/767* | (2006.01) | |
| *C21D 6/00* | (2006.01) | |
| *C21D 8/02* | (2006.01) | |
| *C22C 38/00* | (2006.01) | |

(Continued)

(52) U.S. Cl.
CPC .............. *C21D 9/46* (2013.01); *B32B 15/013* (2013.01); *C21D 1/26* (2013.01); *C21D 1/42* (2013.01); *C21D 1/767* (2013.01); *C21D 6/001* (2013.01); *C21D 6/004* (2013.01); *C21D 6/005* (2013.01); *C21D 6/008* (2013.01); *C21D 8/0205* (2013.01); *C21D 8/0236* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C23C 2/02* (2013.01); *C23C 2/06* (2013.01); *C23C 2/28* (2013.01); *C23C 28/021* (2013.01); *C23C 28/023* (2013.01); *C23C 28/025* (2013.01); *C23C 28/028* (2013.01); *Y02P 10/253* (2015.11); *Y10T 428/12799* (2015.01)

(58) Field of Classification Search
CPC ......... C22C 38/02; C22C 38/04; C22C 38/08; C22C 38/12; C22C 38/16
See application file for complete search history.

(56) References Cited

U.S. PATENT DOCUMENTS

| | | |
|---|---|---|
| 4,067,754 A | 1/1978 | Elias et al. |
| 5,415,703 A | 5/1995 | Ushigami et al. |

(Continued)

FOREIGN PATENT DOCUMENTS

| | | |
|---|---|---|
| FR | 2796083 A1 | 1/2001 |
| FR | 2829775 A1 | 3/2003 |

(Continued)

OTHER PUBLICATIONS

Casanova, T., Soto, F., Eyaud, M. and Crousier, J., Hyrdogen Absorption During Zinc Plating on Steel, Corrosion Science, 1997, pp. 529-537, vol. 39, No. 3, Pergamon, Great Britain.

(Continued)

*Primary Examiner* — Edward M Johnson
(74) *Attorney, Agent, or Firm* — Davidson, Davidson & Kappel, LLC

(57) ABSTRACT

An austenitic steel sheet excellent in resistance to delayed cracking is provided. The composition of said steel comprises in weight:

$0.35\% \leq C \leq 1.05\%$
$15\% \leq Mn \leq 26\%$
$Si \leq 3\%$
$Al \leq 0.050\%$
$S \leq 0.030\%$
$P \leq 0.080\%$
$N \leq 0.1\%$,
at least one metallic element X chosen among vanadium, titanium, niobium, molybdenum, chromium
$0.050\% \leq V \leq 0.50\%$,
$0.040\% \leq Ti \leq 0.50\%$
$0.070\% \leq Nb \leq 0.50\%$
$0.14\% \leq Mo \leq 2\%$
$0.070\% \leq Cr \leq 2\%$.

The composition may optionally include B, Ni and/or Cu. The remainder of the composition includes iron and unavoidable impurities inherent to fabrication, including hydrogen. The quantity $X_p$ of the at least one metallic element under the form of carbides, nitrides or carbonitrides is, in weight:

$0.030\% \leq V_p \leq 0.40\%$ (Continued)

0.030% ≤ Tip ≤ 0.50%
0.040% ≤ Nbp ≤ 0.40%
0.14% ≤ Mop ≤ 0.44%
0.070% ≤ Crp ≤ 0.6%.

The hydrogen content Hmax designating the maximal hydrogen content that can be measured from a series of at least five specimens, and the quantity Xp, in weight, is such that:

$$1000 \frac{H_{max}}{X_P} \leq 3.3.$$

23 Claims, 2 Drawing Sheets

(51) Int. Cl.
 *C22C 38/06* (2006.01)
 *B32B 15/01* (2006.01)

(56) References Cited

U.S. PATENT DOCUMENTS

| | | | |
|---|---|---|---|
| 6,071,631 A * | 6/2000 | Takahata | 428/658 |
| 6,358,338 B1 | 3/2002 | Guelton et al. | |
| 6,679,957 B1 | 1/2004 | Barteri et al. | |
| 7,556,865 B2 | 7/2009 | Drillet et al. | |
| 7,782,262 B2 | 8/2010 | Garreau et al. | |
| 7,794,552 B2 | 9/2010 | Cugy et al. | |
| 7,799,148 B2 | 9/2010 | Scott et al. | |
| 8,926,772 B2 | 1/2015 | Bouzerki et al. | |
| 9,200,355 B2 | 12/2015 | Scott et al. | |
| 2003/0099857 A1 * | 5/2003 | Nomura et al. | 428/659 |
| 2006/0278309 A1 * | 12/2006 | Bouzekri et al. | 148/546 |
| 2008/0035249 A1 | 2/2008 | Scott et al. | |
| 2009/0308499 A1 | 12/2009 | Scott et al. | |

FOREIGN PATENT DOCUMENTS

| | | |
|---|---|---|
| FR | 2857980 A1 | 1/2005 |
| JP | 63266042 A | 11/1988 |
| JP | 06346192 A | 12/1994 |
| JP | 07113117 A | 5/1995 |
| JP | 11102777 A | 4/1999 |
| JP | 2006063358 A | 3/2006 |
| JP | 2006528278 A1 | 12/2006 |
| JP | 2008520830 A1 | 6/2008 |
| JP | 2008528796 A1 | 7/2008 |
| WO | 9313233 A1 | 7/1993 |
| WO | 0233139 A1 | 4/2002 |
| WO | 2005019483 A1 | 3/2005 |
| WO | 2005019843 A1 | 3/2005 |
| WO | 06042930 A1 | 4/2006 |
| WO | 2006056670 A2 | 6/2006 |
| WO | 2006077301 A1 | 7/2006 |

OTHER PUBLICATIONS

Hillier, E.M.K. and Robinson, M.J., Permeation measurements to study hydrogen uptake by steel electroplated with zinc-cobalt alloys, Corrosion Science, 2006, pp. 1019-1035, vol. 48, Elsevier, United Kingdom.

"Fragilisation des aciers par l'hydrogene : étude et prévention," Techniques de l'Ingénieur, pp. 18-19.

* cited by examiner

IRON-CARBON-MANGANESE AUSTENITIC STEEL SHEET

CROSS REFERENCE TO RELATED APPLICATIONS

This is a divisional application of U.S. application Ser. No. 12/373,152 filed Feb. 18, 2009, the entire disclosure of which is hereby incorporated by reference herein.

BACKGROUND

The invention relates to the manufacture of hot-rolled and cold-rolled sheet from iron-carbon-manganese austenitic steels having very high mechanical properties, and especially a high mechanical strength combined with excellent resistance to delayed cracking.

In view of fuel economy and safety in the case of collisions, high strength steels are more and more used in the automobile industry. This requires the use of structural materials that combine a high tensile strength with high ductility. To meet these requirements, patent FR 2 829 775 discloses for example austenitic alloys having as main elements iron, carbon (up to 2%) and manganese (between 10 and 40%) which can be hot-rolled or cold-rolled and have a strength that may exceed 1200 MPa. The mode of deformation of these steels depends on the stacking fault energy: for a sufficiently high stacking fault energy, the observed mode of mechanical deformation is twinning, which results in a high work hardenability. By acting as an obstacle to the propagation of dislocations, the twins increase the flow stress. However, when the stacking fault energy exceeds a certain limit, slip of perfect dislocations becomes the main deformation mechanism and the work hardening is reduced. The patent mentioned above discloses Fe—C—Mn steels whose stacking fault energy is such that a high work hardening is observed combined with a very high mechanical strength. Furthermore, it is known that the sensitivity to delayed cracking increases with the mechanical strength, in particular after certain cold-forming operations since high residual tensile stresses are liable to remain after deformation. In combination with atomic hydrogen possibly present in the metal, these stresses are liable to result in delayed cracking, that is to say cracking that occurs a certain time after the deformation itself. Hydrogen may progressively build up by diffusion to crystal lattice defects, such as matrix/inclusion interfaces, twin boundaries and grain boundaries. It is in the latter areas that hydrogen may become harmful when it reaches a critical concentration after a certain time. For a constant grain size, the time required to attain a critical level depends on the initial concentration of mobile hydrogen, the intensity of the residual stress concentration field and the kinetics of hydrogen diffusion.

In particular circumstances, small amounts of hydrogen may be introduced at some stages of steel fabrication such as chemical or electrochemical pickling, annealing under special atmospheres, electroplating or hot dip galvanizing and during Plasma Vacuum Deposition (PVD). Subsequent machining operations using lubricating oils and greases may be also a cause for hydrogen production after decomposition of these substances at high temperatures.

For example, delayed cracking may be encountered in the fabrication of bolts made out medium-carbon steels, which includes a cold forging step. U.S. Pat. No. 6,261,388 discloses cold forging steels for the fabrication of wires and bars for bolts, gears or shafts. The main elements of the composition are: C: 0.1-0.4%, Mn: 0.3-1%, Si<0.15%, Cr: 0.5-1.2%, B: 0.0003-0.005%, Ti: 0.020-0.1.00% and the matrix contains fine Ti or Nb carbonitrides for limiting grain coarsening. Good resistance to delayed cracking of steels with an ultimate tensile strength (UTS) of 1000-1400 MPa is obtained by forming a dense scale enriched in Cr, thereby increasing corrosion resistance and thus reducing the amount of hydrogen produced in the process of corrosion. Reduction of sulphur and phosphorus were also found as solutions to increase delayed cracking resistance. However, these solutions address quenched and tempered steels whose microstructure totally differs from the fully austenitic steels which will be considered here.

Furthermore, it is known that, according to the level of steel resistance, annealing treatments may be performed to reduce the sensitivity to delayed cracking: ISO standard 2081-1986 related to electrolytic deposits on iron and steel defines annealing treatments on high strength martensitic steels for bolts: annealing temperature $\theta$ and holding times t increase with steel resistance. For the most resistant steels, annealing treatments with $\theta=150-220°$ C., t=24 h, causing hydrogen diffusion, are recommended.

However the document indicates that these treatments are not applicable to coatings applied to sheets or strips in the unfabricated form. Moreover, these treatments address medium carbon martensitic steels with low ductility and not the austenitic Fe—C—Mn alloys mentioned above, whose compositions are totally different. It is also known that the hydrogen diffusion coefficient is very different in austenite when compared to martensite.

SUMMARY OF THE INVENTION

Thus, there is a need to have hot or cold-rolled steel sheets or strips for the fabrication of parts with very high strength and ductility combined with an excellent resistance to delayed cracking. The steel sheets should be bare or zinc-coated. This high resistance to delayed cracking should be obtained even in the case when high tensile residual stresses are present in cold formed parts.

There is also a need to provide a simple process for increasing the resistance to delayed cracking without lowering other properties such as toughness.

An object of the invention is therefore to provide a hot-rolled or cold-rolled steel sheet or strip which has a ultimate tensile strength of greater than 900 MPa, a fracture elongation higher than 50%, which is particularly suitable for cold forming and has a very high resistance to delayed cracking at every stage of fabrication or use.

Another object of the invention is also to provide a coated product whose resistance to delayed cracking could be assessed with simple metallographic observations.

For this purpose, the present invention provides an austenitic steel sheet, or strip, the chemical composition of which comprises, the contents being expressed by weight: $0.35\% \leq C \leq 1.05\%$, $15\% \leq Mn \leq 26\%$, $Si \leq 3\%$, $Al \leq 0.050\%$, $S \leq 0.030\%$, $P \leq 0.080\%$, $N \leq 0.1\%$, at least one metallic element X chosen among vanadium, titanium, niobium, molybdenum, chromium: $0.050\% \leq V \leq 0.50\%$, $0.040\% \leq Ti \leq 0.50\%$, $0.070\% \leq Nb \leq 0.50\%$, $0.14\% \leq Mo \leq 2\%$, $0.070\% \leq Cr \leq 2\%$, and optionally, one or several elements chosen among: $0.0005\% \leq B \leq 0.010\%$, $Ni \leq 2\%$, $Cu \leq 5\%$, the remainder consisting of iron and unavoidable impurities inherent to smelting, including hydrogen, the quantity $X_p$ of metallic element under the form of carbides, nitrides or carbonitrides being, in weight: $0.030\% \leq V_p \leq 0.40\%$, $0.030\% \leq Ti_p \leq 0.50\%$, $0.040\% \leq Nb_p \leq 0.40\%$, $0.14\% \leq Mo_p \leq 0.44\%$, $0.070\% \leq Cr_p \leq 0.6\%$, the hydrogen content $H_{max}$ and the quantity $X_p$, in weight, being such that:

$$1000 \frac{H_{max}}{X_P} \leq 3.3$$

In this last ratio, $H_{max}$ and $X_p$ contents are expressed in the same units of weight.

Preferably, the hydrogen content $H_{max}$ and the quantity $X_p$ are such that $$1000 \frac{H_{max}}{X_P} \leq 2.5$$

According to a preferred embodiment, the steel sheet or strip is fabricated with a zinc or zinc-Y alloy coating, wherein element Y is one or more of Ni, Cr, Mg but not Fe or Mn.

The present invention also provides a coated steel sheet, comprising a base steel having a zinc or zinc—Y alloy coating on the said base steel, where element Y is one or more of Ni, Cr, Mg, but not Fe or Mn, the composition of the base steel comprising, in weight: $0.35\% \leq C \leq 1.05\%$, $15\% \leq Mn \leq 26\%$, $Si \leq 3\%$, $Al \leq 0.050\%$, $S \leq 0.030\%$, $P \leq 0.080\%$, $N \leq 0.1\%$, at least one metallic element X chosen among vanadium, titanium, niobium, molybdenum, chromium: $0.050\% \leq V \leq 0.50\%$, $0.040\% \leq Ti \leq 0.50\%$, $0.070\% \leq Nb \leq 0.50\%$, $0.14\% \leq Mo \leq 2\%$, $0.070\% \leq Cr \leq 2\%$, and optionally, one or several elements chosen among: $0.0005\% \leq B \leq 0.010\%$, $Ni \leq 2\%$, $Cu \leq 5\%$, the remainder consisting of iron and unavoidable impurities inherent to smelting, the quantity $X_p$ of metallic element under the form of carbides, nitrides or carbonitrides being, in weight: $0.030\% \leq V_p \leq 0.40\%$, $0.030\% \leq Ti_p \leq 0.50\%$, $0.040\% \leq Nb_p \leq 0.40\%$, $0.14\% \leq Mo_p \leq 0.44\%$, $0.070\% \leq Cr_p \leq 0.6\%$, the thickness of the coating being less or equal to 50 micrometers, the coating comprising at its interface with the said base material, an iron and manganese rich-Zn alloyed layer, the thickness of the alloyed layer being greater than or equal to 1 micrometer.

Preferably, the thickness of the alloyed layer is greater than or equal to 4 micrometers.

According to a preferred embodiment, the thickness of the alloyed layer is greater than or equal to 7 micrometers.

Preferably, the sheet comprising a base steel with a zinc or zinc—Y coating on the base steel, comprises a metallic coating layer acting as an hydrogen barrier between the steel and the zinc or zinc—Y coating.

The metal of the metallic coating layer is preferably chosen among Sn, Ni, Ti, Cu, W, or Al, or alloys based on these said metals.

According to a preferred embodiment, the metallic coating layer has a thickness between 0.1 and 1 micrometer.

Preferably, the composition of the steel comprises in weight: $0.35\% \leq C \leq 0.50\%$ According to another preferred embodiment, the steel composition comprises: $0.50\% \leq C \leq 0.70\%$.

Preferably, the composition of the steel comprises in weight: $0.70\% \leq C \leq 1.05\%$.

According to a preferred embodiment, the composition of the steel comprises: $17\% \leq Mn \leq 24\%$.

Preferably, the composition of the steel comprises in weight: $16\% \leq Mn \leq 19\%$.

Advantageously, the steel composition comprises $0.070\% \leq V \leq 0.40\%$, the amount of vanadium $V_p$ under the form of precipitated carbides, nitrides, carbonitrides, being: $0.070\% \leq V_p \leq 0.140\%$ Preferably, the steel composition comprises $0.060\% \leq Ti \leq 0.40\%$, the amount of titanium $Ti_p$ under the form of precipitated carbides, nitrides, carbonitrides, being: $0.060\% \leq Ti_p \leq 0.110\%$ According to a preferred embodiment, the steel composition comprises $0.090\% \leq Nb \leq 0.40\%$, the amount of niobium $Nb_p$ under the form of precipitated carbides, nitrides, carbonitrides, being $0.090\% \leq Nb_p \leq 0.200\%$.

Preferably, the steel composition comprises $0.20\% \leq Mo \leq 1.8\%$, the amount of molybdenum $Mo_p$ under the form of precipitated carbides being: $0.20\% \leq Mo_p \leq 0.35\%$.

Preferably, the mean size d of said carbides, nitrides, carbonitrides is comprised between 7 and 20 nanometers Advantageously, at least 75% of the population of said carbides, nitrides, carbonitrides, is located in intragranular position.

The present invention further provides a fabrication process of a steel sheet offering excellent resistance to delayed cracking, comprising the steps of supplying a steel with composition comprising, in weight: $0.35\% \leq C \leq 1.05\%$, $15\% \leq Mn \leq 26\%$, $Si \leq 3\%$, $Al \leq 0.050\%$, $S \leq 0.030\%$, $P \leq 0.080\%$, $N \leq 0.1\%$, at least one metallic element X chosen among vanadium, titanium, niobium, molybdenum, chromium: $0.050\% \leq V \leq 0.50\%$, $0.040\% \leq Ti \leq 0.50\%$, $0.070\% \leq Nb \leq 0.50\%$, $0.14\% \leq Mo \leq 2\%$, $0.070\% \leq Cr \leq 2\%$, and optionally, one or several elements chosen among $0.0005\% \leq B \leq 0.010\%$, $Ni \leq 2\%$, $Cu \leq 5\%$, the remainder being iron and unavoidable impurities inherent to fabrication, of which hydrogen, casting the steel in the form of a semi-product, reheating the semi-product, performing hot rolling of the semi-product up to an end rolling temperature to obtain a sheet, coiling the sheet, optionally performing cold rolling and annealing, the reheating temperature, the end rolling temperature, the coiling temperature, the annealing temperature being chosen to obtain the following quantity $X_p$ of metallic element under the form of carbides, nitrides or carbonitrides: $0.030\% \leq V_p \leq 0.40\%$, $0.030\% \leq Ti_p \leq 0.50\%$, $0.040\% \leq Nb_p \leq 0.40\%$, $0.14\% \leq Mo_p \leq 0.44\%$, $0.070\% \leq Cr_p \leq 0.6\%$, performing at least one soaking treatment where the sheet is soaked at a temperature θ comprised between 250 and 900° C. during a time t d at least 15 s in order that the hydrogen content $H_{max}$ after soaking, $H_{max}$ designating the maximal hydrogen content that can be measured from a series of at least five specimens, and the quantity $X_p$, in weight, satisfies $$1000 \frac{H_{max}}{X_P} \leq 3.3$$

Preferably, the temperature θ and the time t are chosen such as $$1000 \frac{H_{max}}{X_P} \leq 2.5$$

Preferably, the semi-product is heat-treated at a temperature between 900 and 1000° C. for a time comprised between 5 and 20 days.

Even furthermore, the present invention provides a fabrication process of a steel sheet offering excellent resistant resistance to delayed cracking, comprising the steps of
supplying a bare steel sheet, wherein the composition comprises, in weight: 0.35%≤C≤1.05%, 15%≤Mn≤26%, Si≤3%, Al≤0.050%, S≤0.030%, P≤0.080%, N≤0.1%, at least one metallic element X chosen among vanadium, titanium, niobium, molybdenum, chromium: 0.050%≤V≤0.50%, 0.040%≤Ti≤0.50%; 0.070%≤Nb≤0.50%, 0.14%≤Mo≤2%, 0.070%≤Cr≤2%, and optionally, one or several elements chosen among 0.0005%≤B≤0.010%, Ni≤2%, Cu≤5%, the remainder consisting of iron and unavoidable impurities inherent to smelting, the quantity $X_p$ of metallic element under the form of carbides, nitrides or carbonitrides being, in weight: 0.030%≤$V_p$≤0.40%, 0.030%≤$Ti_p$≤0.50%, 0.040%≤$Nb_p$≤0.40%, 0.14%≤$Mo_p$≤0.44%, 0.070%≤$Cr_p$≤0.6% soaking said sheet under a pure nitrogen or argon atmosphere with a dew point lower than −30° C. at a temperature θ comprised between 250 and 900° C.

Another fabrication process of a coated steel strip or sheet offering excellent resistant resistance to delayed cracking is provided. The fabrication process comprises the steps of:
supplying a Zn or Zn—Y alloy coated steel strip or sheet, where element Y is one or more of Ni, Cr, Mg but not Fe ore Mn, the steel composition comprising, in weight: 0.35%≤C≤1.05%, 15%≤Mn≤26%, Si≤3%, Al≤0.050%, S≤0.030%, P≤0.080%, N≤0.1%, at least one metallic element X chosen among vanadium, titanium, niobium, molybdenum, chromium: 0.050%≤V≤0.50%, 0.040%≤Ti≤0.50%, 0.070%≤Nb≤0.50%, 0.14%≤Mo≤2%, 0.070%≤Cr≤2%, and optionally, one or several elements chosen among: 0.0005%≤B≤0.010%, Ni≤2%, Cu≤5%, the remainder consisting of iron and unavoidable impurities inherent to smelting, the quantity Xp of metallic element under the form of carbides, nitrides or carbonitrides being, in weight: 0.030%≤$V_p$≤0.40%, 0.030%≤$Ti_p$≤0.50%, 0.040%≤$Nb_p$≤0.40%, 0.14%≤$Mo_p$≤0.44%, 0.070%≤$Cr_p$≤0.6% soaking under a pure nitrogen or argon atmosphere with a dew point lower than −30° C. the strip or sheet at a temperature θ comprised between 250 and 900° C. during a time t, the temperature and time satisfying: θ(° C.)Ln(t(s))≥2200.

A further fabrication process of a hot rolled coated steel sheet offering excellent resistant resistance to delayed cracking is provided. The further fabrication process comprises the steps of:
supplying a steel composition comprising, in weight 0.35%≤C≤1.05%, 15%≤Mn≤26%, Si≤3%, Al≤0.050%, S≤0.030%, P≤0.080%, N≤0.1%, at least one metallic element X chosen among vanadium, titanium, niobium, molybdenum, chromium, 0.050%≤V≤0.50%, 0.040%≤Ti≤0.50%, 0.070%≤Nb≤0.50%, 0.14%≤Mo≤2%, 0.070%≤Cr≤2%, and optionally, one or several elements chosen among 0.0005%≤B≤0.010%, Ni≤2%, Cu≤5%, the remainder being iron and unavoidable impurities inherent to fabrication;
casting a semi product from the said steel composition;
heating said semi product to a temperature between 1100 and 1300° C.
hot rolling the semi-product with an end-of-rolling temperature of 890° C. or higher to obtain a sheet
coiling said sheet at a temperature below 580° C.
coating said sheet with a Zn or Zn—Y alloy coating
performing at least one soaking treatment on said coated sheet, said soaking being performed under a pure nitrogen or argon atmosphere with a dew point lower than −30° C., at a temperature θ comprised between 250 and 900° C. during a time t, said temperature and time satisfying: θ(° C.)Ln(t(s))≥2200.

The present invention provides a fabrication process of a cold rolled coated steel sheet offering excellent resistant resistance to delayed cracking, comprising the steps of:
supplying a steel composition as exposed above
casting a semi product from the said steel composition
heating said semi product to a temperature between 1100 and 1300° C.
hot rolling said semi-product with an end-of-rolling temperature of 890° C. or higher to obtain a sheet
coiling said sheet at a temperature below 580° C.
performing at least one cold rolling of said sheet
performing at least one annealing treatment of said sheet, said treatment comprising a heating rate Vh of between 2 and 10° C./s, at a temperature Ts of between 700 and 870° C. for a time between 30 and 180 s and a cooling rate of between 10 and 50° C./s
coating said sheet with a Zn or Zn—Y coating
performing at least one soaking treatment on said coated sheet, said soaking being performed under a pure nitrogen or argon atmosphere with a dew point lower than −30° C., at a temperature θ comprised between 250 and 900° C. during a time t, said temperature and time satisfying: θ(° C.)Ln(t(s))≥2200.

Preferably, the time and temperature satisfy: θ(° C.)Ln(t(s))≥2450.

Advantageously, the time and temperature satisfy: θ(° C.)Ln(t(s))≥2750.

The soaking temperature θ is preferably below recrystallization temperature.

Preferably, the soaking is performed by continuous annealing.

According to a preferred embodiment, soaking is performed by batch annealing.

Preferably, the soaking treatment is performed by open coil annealing.

According to another preferred embodiment, soaking is performed by induction heating.

Preferably, the heating is performed with transversal electromagnetic field.

The present invention further provides a fabrication process according to the steps above, wherein the steel sheet is cold formed to obtain a part, and the soaking is performed before or after cold forming of the part. The present invention also provides for the use of an austenitic steel sheet according to the description above, or fabricated by a process according to the description above, for the fabrication of structural parts, reinforcing elements or external parts for the automotive industry.

BRIEF DESCRIPTION OF THE DRAWINGS

Further features and advantages of the invention will become apparent over the course of the description below and in the annexed figures which are given by way of example.

DETAILED DESCRIPTION

Figure 1:
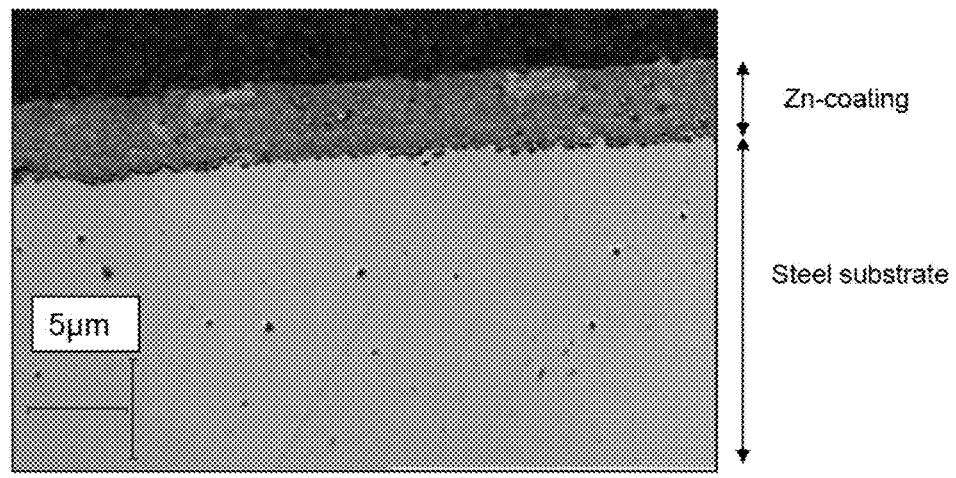
FIG. 1 illustrates a Zn-coated steel sheet whose coating characteristics do not correspond to the invention.

After numerous trials, the inventors have found that the various requirements mentioned above can be met by observing the following conditions:

As regard to the chemical composition of the steel, carbon plays a very important role in the formation of the microstructure and the mechanical properties. It increases the stacking fault energy and promotes stability of the austenitic phase. When combined with a manganese content ranging from 15 to 26% by weight, this stability is achieved for a carbon content of 0.35% or higher. However, for a carbon content above 1.05%, it becomes difficult to prevent excessive precipitation of carbides during certain thermal treatments during industrial manufacture, which degrades the ductility.

Preferably, the carbon content is between 0.35 and 0.50% by weight so as to obtain satisfactory strength combined with sufficient carbides or carbonitrides precipitation.

When the carbon content is higher than 0.50% and lower than or equal to 0.70%, the UTS is higher than 900 MPa and the carbides and carbonitrides precipitate in an optimal way.

When the carbon content is higher than 0.70% and lower than or equal to 1.05%, the strength is higher than 1050 MPa.

Manganese is also an essential element for increasing the strength, for increasing the stacking fault energy and for stabilizing the austenitic phase. If its content is less than 15%, there is a risk of forming martensite which greatly reduces the deformability. When the manganese content is higher than 26%, the UTS at room temperature is lowered. Moreover, for cost reasons, it is undesirable for the manganese content to be high.

Preferably, the manganese content is between 17 and 24% so as to optimize the stacking fault energy and to prevent the formation of martensite under the effect of cold deformation. Moreover, when the manganese content is greater than 24%, the deformation mode by twinning is less favored than the mode of deformation by perfect dislocation glide. According to another preferable embodiment, the manganese content is between 16 and 19%: this range is particularly well suited when carbon content is comprised between 0.70 and 1.05% C since the stacking fault energy is optimal.

Aluminum is a particularly effective element for the deoxidation of steel. Like carbon, it increases the stacking fault energy. However, aluminum in excess has a drawback in steels having a high manganese content, since manganese increases the solubility of nitrogen in liquid iron. If an excessively large amount of aluminum is present in the steel, the nitrogen which combines with aluminum precipitates in the form of aluminum nitrides that impede the migration of grain boundaries and appreciably increase the risk of cracks in continuous casting. An Al content of 0.050% or less prevents the precipitation of AlN.

Correspondingly, the nitrogen content must be 0.1% or less so as to prevent this precipitation and the formation of volume defects (blowholes) during solidification. In addition, the nitrogen content must not exceed 0.1% for fear of causing coarse precipitation which is ineffective for hydrogen trapping.

Silicon is also an effective element for deoxidizing steel and for solid-phase hardening. However, above 3%, it reduces the elongation and tends to form undesirable oxides during certain assembly processes and must therefore be kept below this limit.

Sulphur and phosphorus are impurities that embrittle the grain boundaries. Their respective contents must not exceed 0.030 and 0.080% so as to maintain sufficient hot ductility.

Optionally, boron may be added in an amount of between 0.0005 and 0.010%. This element segregates at the austenitic grain boundaries and increases their cohesion. Below 0.0005%, this effect is not obtained. Above 0.010%, boron precipitates in the form of borocarbides and the effect is saturated.

Nickel may be used optionally for increasing the strength of the steel by solution hardening. Nickel contributes to achieve a high fracture elongation and to increase toughness. However, it is desirable again for cost reasons, to limit the nickel content to a maximum content of 2% or less.

Likewise, optionally, an addition of copper with a content not exceeding 5% is one means of hardening the steel by precipitation of copper metal However, above this limit, copper is responsible for the appearance of surface defects in hot-rolled sheet.

Metallic elements capable of forming precipitates, such as vanadium, titanium, niobium, chromium and molybdenum, play an important role within the context of the invention in conjunction with the hydrogen content. This is because delayed cracking is caused by an excessive local concentration of hydrogen, in particular at the austenitic grain boundaries. The inventors have found that certain types of precipitates, the nature, amount, size and distribution of which are precisely defined in the invention, very appreciably reduce the sensitivity to delayed cracking and do so without degrading the ductility and toughness properties.

The inventors have firstly demonstrated that precipitated vanadium, titanium or niobium carbides, nitrides or carbonitrides are very effective as hydrogen traps. Chromium or molybdenum carbides may also fulfil this role. At room temperature, the hydrogen is therefore trapped irreversibly at the interface between these precipitates and the matrix. However, it is necessary, to ensure trapping of the residual hydrogen that might be encountered under certain industrial conditions, for the amount of metal elements in the form of precipitates to be equal to or above a critical content, which depends on the nature of the precipitates and of the total maximum hydrogen content. The amount of metal elements in the form of carbide, nitride and carbonitride precipitates is denoted by $V_p$, $Ti_p$ and $Nb_p$ in the case of vanadium, titanium and niobium respectively and by $Cr_p$ and $Mo_p$ in the case of chromium and molybdenum in carbide form. More generally, these metallic elements (V, Ti, Nb, Mo, Cr) are designated by "X", and the corresponding amount in the form of precipitates is designated by "$X_p$".

In this regard, the steel contains one or more metallic element X chosen from:

vanadium, in an amount of between 0.050 and 0.50% by weight, and with the amount in precipitate form $V_p$ between 0.030% and 0.40% by weight. Preferably, the vanadium content is between 0.070% and 0.40%, the amount $V_p$ being between 0.070% and 0.140% by weight;

titanium, in an amount Ti of between 0.040 and 0.50% by weight, the amount $Ti_p$ in precipitate form being between 0.030% and 0.50%. Preferably, the titanium content is between 0.060% and 0.40%, the amount $Ti_p$ being between 0.060% and 0.110% by weight;

niobium, in an amount of between 0.070 and 0.50% by weight, the amount $Nb_p$ in precipitate form being between 0.040 and 0.40%. Preferably, the niobium content is between 0.090% and 0.40%, the amount $Nb_p$ being between 0.090% and 0.200% by weight;

chromium, in an amount of between 0.070% and 2% by weight, the amount $Cr_p$ in precipitate form being between 0.070% and 0.6%, and molybdenum, in an amount of between 0.14 and 2% by weight, the amount $Mo_p$ in precipitate form being between 0.14 and 0.44%. Preferably, the molybdenum content is between 0.20 and 1.8%, the amount $Mo_p$ being between 0.20 and 0.35%.

The minimum value expressed for these various elements (for example 0.050% in the case of vanadium) corresponds to an amount of addition needed to form precipitates in the manufacturing heat cycles. A preferred minimum content (for example 0.070% in the case of vanadium) is recommended, so as to obtain a higher amount of precipitates.

The maximum value expressed for these various elements (for example 0.50% in the case of vanadium) corresponds to excessive precipitation, or precipitation in an inappropriate form, degrading the mechanical properties, or to an uneconomical implementation of the invention. A preferred maximum content (for example 0.40% in the case of vanadium) is recommended, so as to optimize the addition of the element.

The lower value of metal elements in precipitate form (for example 0.030% in the case of vanadium) corresponds to the minimum amount of precipitation required to be effective in reducing the sensitivity to delayed cracking. A preferred minimum amount (for example 0.070% in the case of vanadium) is recommended, so as to obtain a particularly high resistance to delayed cracking.

The maximum value of metallic elements in the form of precipitates (for example 0.40% in the case of vanadium) marks the deterioration in the ductility or toughness, fracture being initiated on the precipitates. Moreover, above this maximum value, intense precipitation occurs, which may prevent complete recrystallization during continuous annealing heat treatments after cold rolling.

A preferred maximum content in precipitate form (for example 0.140% in the case of vanadium) is recommended, so that the ductility is maintained as high as possible and so that the precipitation obtained is compatible with the recrystallization under the annealing conditions.

The inventors have shown that an excellent resistance to delayed cracking is obtained when the ratio of the hydrogen content ($H_{max} \times 1000$) over $X_p$ is inferior or equal to 3.3. In this ratio, the $H_{max}$ and $X_p$ contents are expressed in the same weight units. If different elements X are present in the form of precipitates, the quantity $X_p$ in the ratio $$1000 \frac{H_{max}}{X_P}$$

designates the sum of the different quantities precipitated.

A particularly high resistance is obtained when this ratio is inferior or equal to 2.5. Thus, it appears that the hydrogen content $H_{max}$ has to be maintained below a certain level, this level being a function of the amount of metallic precipitates mentioned above.

$H_{max}$ designates the total hydrogen which can be measured on a steel sheet, either bare or coated sheet, in particular with Zn or Zn alloy coating. The term of "total" hydrogen is used here by opposition to the "diffusible" hydrogen, which can be measured for example in a ferritic steel by degassing under a flux of pure dried nitrogen at a temperature of 200° C. for instance. However, as the diffusion of hydrogen in austenitic steel is much lower than in a ferritic steel, the distinction between diffusible and trapped hydrogen is not so obvious to obtain experimentally. Furthermore, the inventors have experienced that measuring the total hydrogen, i.e. diffusible plus trapped hydrogen, gives more reliable correlations with delayed fracture than if only diffusible hydrogen is measured with current techniques. The measurement of $H_{max}$ is the following: a specimen is cut to a sufficient size to provide a weight of at least 1 g. After cleaning and drying in order avoid any pollution that could lead to erroneous values, the specimen is heated at a sufficiently high temperature to be melt inside a chamber submitted to a flux of pure nitrogen. A cell measures the thermal conductibility of the gas and detects the proportion of hydrogen. This corresponds to a usual procedure for hydrogen measurement.

This hydrogen measurement is performed on at least 5 different specimens: the value $H_{max}$ does not designate the mean value H obtained from these different measurements, but the maximum value of all the individual hydrogen measurements. The inventors have shown a strong correlation between the ratio $H_{max}/X_p$ and the resistance to hydrogen cracking, while the correlation with the ratio $\overline{H}/X_p$ was not so satisfactory. Furthermore, the inventors have found that an excessive mean precipitate size reduces the trapping effectiveness. The expression "mean precipitate size" means here the size that can be measured for example using extraction replicas, followed by transmission electron microscope observations: the diameter (in the case of spherical or almost spherical precipitates) or the longest length (in the case of precipitates of irregular shape) of each precipitate is measured and then a size distribution histogram for these precipitates is generated, from which the mean $\overline{d}$ is calculated by counting a statistically representative number of particles, for example more than 400. Above a mean size $\overline{d}$ of 20 nanometers, the effectiveness of the hydrogen trapping decreases owing to the reduced interfacial area between the precipitates and the matrix. For a given precipitate amount, a mean precipitate size exceeding 20 nanometers also reduces the density of precipitates that are present, thus excessively increasing the distance between trapping sites. The interfacial area for hydrogen trapping is also reduced However when the mean particle size $\overline{d}$ is less than 7 nanometers, the precipitates will have a tendency to form so as to be coherent with the matrix, thus reducing the trapping capability. The difficulty of controlling these very fine precipitates is also increased. This mean value may include the presence of numerous very fine precipitates, having a size of the order of a nanometer.

The inventors have also found that the precipitates are advantageously located in intragranular positions so as to reduce the sensitivity to delayed cracking. This is because, when at least 75% of the population of the precipitates lie in intragranular position, the hydrogen which is possibly present is distributed more uniformly without accumulation at the austenitic grain boundaries that are potential sites of embrittlement.

In the case of steel strips or sheets of the above composition coated by a zinc or zinc-Y alloy coating where element Y is one or more of Ni, Cr, Mg, but not Fe or Mn, either on one or both faces of the strips or sheets, the thickness of the coating being less than or equal to 50 micrometers, the inventors have shown that an excellent resistance to delayed cracking was obtained when this coating includes a particular alloyed layer with a minimal thickness of 1 micrometer: this layer rich in iron (which means at least 6% iron in weight in the layer) and rich in manganese (which means at least 1.7% Mn in weight in the layer) is located at the interface between the steel substrate and the zinc or zinc-Y alloy layer.

Improved resistance to delayed cracking is obtained when the thickness of this alloyed layer is greater than 4 micrometers, and optimal when the thickness is more than 7 micrometers. No upper limit is fixed since the totality of the coating may be composed by the alloyed layer for an improved resistance to delayed cracking. Without being bound by a theory, it is thought that the formation of this alloyed layer improves the homogenization of hydrogen repartition and smoothes the hydrogen peak which may be present at the interface between the coating and the substrate, as will be explained later.

The manufacturing process according to the invention is carried out as follows: a steel is smelted with the following composition: 0.35%≤C≤1.05%, 15%≤Mn≤26%, Si≤3%, Al≤0.050%, S≤0.030%, P≤0.080%, N≤0.1%, at least one metallic element X chosen among vanadium, titanium, niobium, molybdenum, chromium: 0.050%≤V≤0.50%, 0.040%≤Ti≤0.50%, 0.070%≤Nb≤0.50%, 0.14%≤Mo≤2%, 0.070%≤Cr≤2%, and optionally, one or several elements chosen among: 0.0005%≤B≤0.010%, Ni≤2%, Cu≤5%, the remainder consisting of iron and unavoidable impurities inherent to smelting, including hydrogen. After smelting, the steel is cast in the form of a semi-product, for example a slab. Optionally, this semi-product may be heat treated at a temperature between 900 and 1000° C., for a time comprised between 5 and 20 days.

This heat treatment makes it possible to obtain a very low level of hydrogen and an improved resistance to delayed cracking of the final product.

The steel semi-product is reheated, hot rolled and coiled in order to obtain a strip or sheet with thickness ranging for example from 2 to 5-10 mm. This strip or sheet may be optionally cold-rolled down to a thickness ranging from 0.2 mm to a few millimeters and annealed, namely by continuous annealing, for obtaining recrystallization.

The reheating temperature before hot rolling, the end rolling temperature, the coiling temperature, and, in the case of a cold rolled sheet, the annealing temperature will be chosen so as to obtain a precipitation of the following quantity $X_p$ of metallic element under the form of carbides, nitrides or carbonitrides: 0.030%≤$V_p$≤0.40%, 0.030%≤$Ti_p$≤0.50%, 0.040%≤$Nb_p$≤0.40%, 0.14%≤$Mo_p$≤0.44%, 0.070%≤$Cr_p$≤0.6.

In particular, for hot rolled strips the coiling temperature will be chosen in the range where the kinetics of precipitation of $X_p$ is maximal in conditions of isothermal holding. Adequate precipitation is obtained when the reheating of the semi-product is between 1100 and 1300° C., when the end rolling temperature is 890° C. or higher and when the coiling temperature is below 580° C.

When the final product is a cold rolled strip, the reheating temperature before hot rolling, the end rolling temperature and the coiling temperature will be chosen so as to minimize the amount of precipitation in the hot coil, thus facilitating cold rolling. The continuous annealing temperature for recrystallization is then chosen so as to maximize the precipitation of $X_p$. The above parameters will be more particularly chosen in order to obtain the following preferred range for the quantity of precipitation: $X_p$: 0.070%≤$V_p$≤0.140%, 0.060%≤$Ti_p$≤0.110%, 0.090%≤$Nb_p$≤0.200%, 0.20%≤$Mo_p$≤0.35%, 0.070%≤$Cr_p$≤0.6%.

According to the invention, the strip or sheet, either in the hot-rolled state, or in the hot and subsequently cold-rolled state, or in the hot-rolled and subsequently cold-rolled and annealed state (the cold rolling and annealing steps being eventually performed more than one time) is subsequently soaked at a temperature θ comprised between 250 and 900° C. during a time t of at least 15 seconds in order that the hydrogen content $H_{max}$ of the sheet after soaking and the quantity $X_p$, in weight, satisfy:

$$1000\frac{H_{max}}{X_p} \leq 3.3$$

As mentioned above, $H_{max}$ designates the maximum value which is measured from at least 5 different hydrogen measurements.

This soaking treatment may be performed one or several times in the fabrication cycle, provided that the condition:

$$1000\frac{H_{max}}{X_p} \leq 3.3$$

is respected at the end of each of these soaking treatments.

For a soaking temperature θ under 250° C. or for a time below 15 seconds, no improvement in the resistance to delayed cracking is observed. Above 900° C., the growth of grains is rapid producing a detrimental effect on the yield strength.

When the combination (θ, t) is such that $$1000\frac{H_{max}}{X_p} \leq 3.3,$$

the resistance to delayed cracking is much improved. When the combination (θ, t) is such that $$1000\frac{H_{max}}{X_p} \leq 2.5,$$

the resistance to delayed cracking is extremely high.

In the case where the steel sheet having the composition above is coated by zinc or zinc-Y alloy, the inventors have found that improvement of the resistance to delayed cracking is obtained when the parameters (θ, t) for the soaking treatment are such that: θ Ln(t)≥2200, θ being in ° Celsius, and t being in seconds.

Contrarily to the previous art, this soaking treatment is performed on the Zn or Zn—Y alloy-coated steel sheet, the steel substrate having an austenitic structure. Furthermore, the soaking treatment on Zn or Zn—Y alloy coated products are conventionally performed at low temperature in order to prevent the formation of a layer alloyed with iron at the interface between the substrate and the Zn or Zn—Y alloy coating. This layer is thought to hamper any hydrogen removal from the martensitic substrate. The inventors have found that the presence of such an alloyed layer was in fact beneficial for the resistance of the present austenitic substrate to delayed cracking, as it may act as a barrier to the hydrogen diffusion from the upper Zn or Zn—Y alloy layer toward the present austenitic substrate. Thus, the soaking conditions exposed above control the formation of alloyed layer at the substrate interface and the amount of hydrogen degassing from the substrate and the coating.

A higher resistance to delayed cracking is obtained when: $\theta(°\,C.)Ln(t(s)) \geq 2450$, an extremely high resistance being observed when: $\theta(°\,C.)Ln(t(s)) \geq 2750$. These particular soaking conditions are associated with the formation of the layer rich in iron and manganese at the interface between the steel substrate and the zinc or zinc-Y layer mentioned above. According to these three soaking conditions ($\theta(°\,C.)Ln(t(s)) \geq 2200$, 2450 or 2750, Fe and Mn-rich layer with minimal thicknesses of respectively 1 micrometer, 4 micrometers and 7 micrometers are formed.

The soaking treatment for bare or coated sheets is performed with the following characteristics:

dry atmosphere during soaking, with a dew point lower than −30° C., lowest fraction of hydrogen, by using a pure nitrogen or argon atmosphere, to improve the driving force for H degassing from the material dynamic circulation of a regenerated atmosphere by opposition to a static and stagnant atmosphere that may enrich in hydrogen from the material during the treatment and thus limit the degassing efficiency.

As the soaking treatment has not for objective to obtain recrystallization, it is advantageous to limit the temperature $\theta$ below the recrystallization temperature TR of the steel.

Without being bound by a theory, it is thought that soaking in the particular conditions of the invention, has the following effects on a coated sheet:

Hydrogen degassing from the coating and the interface between the austenitic substrate and the coating Homogenization of the hydrogen distribution through the sheet thickness Activation of hydrogen trapping in the present austenitic substrate on the particular metallic precipitates mentioned above.

Formation of an alloyed layer of Zn-enriched in Fe and Mn, acting as a barrier against hydrogen which may come from the remaining unalloyed Zn or Zn—Y alloy coating, or from further processing The soaking treatment may be performed by different processes, such as for example, continuous annealing, batch annealing, or annealing by induction heating. According to a preferred embodiment, the soaking treatment may be performed by batch annealing, i.e. where the steel sheets, generally in the form of coils, are static as respect to the annealing furnace.

According to a particular embodiment, this soaking treatment may be advantageously performed by open coil annealing: This refers to the technique where steel sheet is wound with separations between each successive wrap of the coil. As a consequence, the separations allow easier gas circulation and exchanges. The coil separation allows gas to circulate between the sheets during annealing and easier degassing from the coating.

According to another particular embodiment, the soaking treatment may be performed by induction heating sheets or parts: as the steel compositions above are amagnetic, induction heating may be advantageously performed with transverse flux inductors: the induction coils are placed on one or both sides of the sheet or part to heat. Lines of the magnetic field are perpendicular to the longitudinal direction and the relative displacement. A particular advantage is obtained from this heating mode, since the sheets or parts are thin and are efficiently and uniformly heated with transverse flux inductors.

According to another particular embodiment, soaking in the conditions of the invention may be performed on a part which has been taken out of a sheet and afterwards cold formed, for example by stamping. In this way, the heat treatment does not only yield hydrogen degassing and the formation of an interfacial alloyed layer in the case of coated steel, but also efficiently reduces the residual stresses which are introduced during the cold forming of the part.

Alternatively, in the case of Zn or Zn—Y alloy sheets, a thin intermediate metallic layer between the Zn or Zn—Y alloy coating and the steel substrate may be also used to improved resistance to delayed cracking providing that the process used for its deposition leads to a low pick-up in hydrogen. This thin metallic intermediate layer acts as a barrier against hydrogen which may come from the Zn or Zn—Y alloy coating, or from further processing.

The manufacturing process is the following: the bare sheet of the above composition is coated with a thin metallic coating whose thickness may range between 0.1 and 1 micrometer for example. The metal of this thin layer may be Sn, Ni, Ti, Cu, W, or Al, or alloys based on these metals. This coating may be performed by processes such as electroplating or PVD for example, the conditions being adapted to limit the hydrogen pick-up. Thereafter, the Zn or Zn—Y alloy coating is performed through electroplating.

By way of nonlimiting example, the following results will show the advantageous characteristics afforded by the invention.

EXAMPLE

Steels having the composition given in the table 1 below were elaborated. Steel D has almost no metallic element "X" able to precipitate for further hydrogen trapping. The steels were smelted and cast in the form of semi-products. These were reheated at 1180° C., hot rolled with an end rolling temperature of 950° C. down to a thickness of between 2.5 and 3.5 mm and further coiled at a temperature less than 500° C. The strips obtained were further cold rolled down to a thickness of between 1 and 1.5 mm. The strips were submitted to continuous annealing treatments. Some of the strips were tested in the uncoated condition, others (compositions A et C) were further coated after continuous annealing and tested in such condition. The details and results in the uncoated or coated conditions will be exposed below.

TABLE 1

Steel compositions, expressed in percentage by weight

| Steel | C (%) | Mn (%) | Si (%) | Al (%) | S (%) | P (%) | N (%) | V (%) | Mo (%) | Ni (%) | Cu (%) |
|---|---|---|---|---|---|---|---|---|---|---|---|
| A | 0.627 | 21.96 | 0.193 | <0.040 | <0.005 | 0.023 | 0.011 | 0.210 | — | 0.044 | 0.014 |
| B | 0.593 | 21.92 | 0.232 | <0.040 | <0.005 | 0.023 | 0.011 | 0.202 | 0.010 | 0.071 | 0.039 |
| C | 0.604 | 22.06 | 0.199 | <0.040 | <0.005 | 0.022 | 0.010 | 0.231 | 0.011 | 0.058 | 0.029 |
| D | 0.574 | 22.57 | 0.198 | <0.040 | <0.005 | 0.017 | 0.009 | 0.005 | 0.004 | 0.034 | 0.011 |

Uncoated Strips or Sheets:

All the cold rolled sheets were continuously annealing at a soaking temperature between 740° C. and 810° C. in order to obtain a full recrystallization of the austenitic microstructure. The treatment included heating with a heating rate of 3° C./s, cooling at a rate of 25° C./s. In some cases, some cold rolled sheets of the same composition were annealed with different conditions. References A1, A2, A3 ... designate for example sheets of the composition A annealed in conditions 1, 2, 3 .... For two sheets, referred as A5 and C2, further soaking by batch annealing was performed on the cold rolled and continuously-annealed sheets. The different temperatures (θ) and time (t) of treatments are shown in table 2. By using different treatments conditions, namely dew point or hydrogen content in the gas of the annealing atmosphere, the hydrogen content was varied: table 2 shows the hydrogen content $H_{max}$ and the quantity of precipitates $X_p$, here under the form of vanadium carbonitrides, which were measured on the sheets after soaking. All the treatments (continuous or batch annealing) corresponding to the invention were performed under a pure nitrogen or argon atmosphere with a dew point lower than −30° C. The amount $X_p$ was determined in the various sheets by selective chemical dissolution followed by the ICP-OES (Inductive Coupled Plasma-Optical Emission Spectroscopy) analysis method. $H_{max}$ was measured according to the method explained previously, using five specimens. Other characteristics of the precipitates such as the mean size and their localization as respect to grain boundaries were measured on the basis of extraction replicas observed using transmission electron microscopy.

TABLE 2

Soaking conditions on uncoated steel sheets and characteristics of hydrogen and precipitates.

| Sheet | θ (° C.) | t(s) | $H_{max}$ (%) | $X_p$ (%) | $1000\frac{H_{max}}{X_P}$ | Precipitates $X_p$ with size $\bar{d}$ (μm)) comprised between 7 and 20 nm | Localization of >75% of precipitates $X_p$ in intragranular position |
|---|---|---|---|---|---|---|---|
| A4 (invention) | 780 | 120 | 0.00022 | 0.150 | 1.46 | (○) | (○) |
| A5 (invention) | 320 | 259200 | 0.00026 | 0.150 | 1.73 | (○) | (○) |
| A1 (invention) | 787 | 174 | 0.00026 | 0.127 | 2.06 | (○) | (○) |
| C2 (invention) | 320 | 259200 | 0.00031 | 0.141 | 2.19 | (○) | (○) |
| A2 (invention) | 800 | 180 | 0.00029 | 0.128 | 2.28 | (○) | (○) |
| C1 (invention) | 800 | 180 | 0.00040 | 0.144 | 2.76 | (○) | (○) |
| B (invention) | 800 | 180 | 0.00036 | 0.114 | 3.16 | (○) | (○) |
| A3 (reference) | 808 | 188 | 0.00047 | 0.119 | 3.91 | (○) | (○) |
| D (reference) | 740 | 120 | 0.00023 | <0.005 | >46 | (●) | (●) |

Underlined values are outside the conditions of invention.
(○) = Satisfactory
(●) = Unsatisfactory Table 3 shows the mechanical properties, Ultimate Tensile Strength (UTS) and fracture elongation A obtained under these conditions. Moreover, circular blanks, 135 mm in diameter were cut from the sheets. These blanks were then fully drawn so as to obtain flat-bottomed cups (cup tests) using a punch of 75 mm in diameter. After forming, elastic springback of the cup increases its diameter to 83 mm. In this way, the factor β characterizing the severity of the test (i.e. the ratio of the initial blank diameter to the punch diameter) was 1.8. The cups are deformed in the deep drawing mode, which produces locally high residual tensile stresses especially at the cup rim. As a supplementary source of stresses, the cups were submitted to an elastic compression reducing their diameter to 75 mm. These conditions tests are severe since the major principal stress is in the order of magnitude of the fracture stress. The eventual presence of microcracks was checked in this test, either immediately after forming or after waiting for 3 months, thus characterizing any sensitivity to delayed cracking. For obtaining even more severe test conditions, a test with a plastic deformation reducing the diameter to 70 mm has been also performed on some specimens. The results of the observations are given in Table 3.

TABLE 3

Mechanical properties and resistance to delayed cracking on uncoated steel sheets

|  | Sheet | $1000\frac{H_{max}}{X_P}$ | UTS (MPa) | A (%) | Resistance to delayed cracking (severe test condition) |
|---|---|---|---|---|---|
| Invention | A4 | 1.46 | 1150 | 51 | (○) |
|  | A5 | 1.73 | 1155 | 50 | (○) |
|  | A1 | 2.06 | 1147 | 50 | (○) |
|  | C2 | 2.19 | 1150 | 53 | (○) |
|  | A2 | 2.28 | 1136 | 56 | (○) |
|  | C1 | 2.76 | 1150 | 51 | (○) |
|  | B | 3.16 | 1132 | 54 | (○) |
| Reference | A3 | 3.91 | 1137 | 53 | (●) |
|  | D | >46 | 1056 | 60 | (●) |

(○): Satisfactory result
(●): Unsatisfactory result.
Underlined values are outside the conditions of invention When $$1000\frac{H_{max}}{X_P}$$

exceeds 3.3, i.e. for a combination where the maximal hydrogen content is too high and the amount of precipitates is too low, the risk of delayed fracture is increased since some specimens show microcracks in the conditions of the severe test, where compression to 75 mm causes elastic straining.

When $$1000\frac{H_{max}}{X_P}$$

is inferior to 2.5, i.e. for a combination where the maximal hydrogen content is quite low and the amount of precipitates is high, the resistance to delayed fracture is excellent even in the conditions of the extremely severe test (plastic compression of the cup to 70 mm)

Coated Sheets:

As mentioned above, steel sheets with compositions A and C have been cold rolled, then continuous-annealed at 800° C. for 180 s and further coated with Zn, 7.5 micrometers on each face, by electroplating in a ZnSO4 bath. The sheets were further soaked by batch annealing in argon atmosphere with a dew point of −40° C. with different conditions of temperature (θ) and time (t) shown in table 4. For all the conditions, UTS was higher than 1100 MPa, and elongation greater than 50%. The sensitivity to delayed cracking was evaluated on deep-drawn cups. The drawing ratio (initial blank diameter/final cup diameter) of the cups was 1.8. The cups were then submitted to two stress levels: compression of the cup rim in a vice such that the diameter was reduced from 82 mm down to 75 mm in the direction perpendicular to the jaws of the vice (severe test condition) or 70 mm (extremely severe test condition). Furthermore, Glow Discharge Optical Emission Spectroscopy (GDOES) was performed in order to evaluate the distribution of elements in the coating and in the steel substrate.

TABLE 4

Resistance to delayed cracking of coated steel sheets

|  | Sheet | Hmax (%) | Xp (%) | $1000\frac{H_{max}}{X_P}$ | θ (° C.) | t(h) | θ (° C.) Ln (t(s)) | Thickness of alloyed layer (μm) | Resistance to delayed cracking (severe test condition) |
|---|---|---|---|---|---|---|---|---|---|
| Invention | C1' | 0.00035 | 0.141 | 2.48 | 350 | 48 | 4221 | 8 | (○) |
|  | A7' | 0.00019 | 0.127 | 1.50 | 300 | 8 | 3080 | 7.5 | (○) |
|  | A6' | 0.00037 | 0.127 | 2.91 | 300 | 1 | 2457 | 5.3 | (○) |
|  | A5' | 0.00040 | 0.127 | 3.15 | 250 | 8 | 2567 | 4.5 | (○) |
|  | A4' | 0.00041 | 0.127 | 3.22 | 250 | 1 | 2047 | 1 | (○) |
| Reference | A3' | 0.00043 | 0.127 | 3.38 | 200 | 24 | 2273 | 0.9 | (●) |
|  | A2' | 0.00047 | 0.127 | 3.7 | 200 | 8 | 2054 | 0 | (●) |
|  | A1' | 0.00066 | 0.127 | 5.19 | 200 | 1 | 1638 | 0 | (●) |

(○): Satisfactory result
(●): Unsatisfactory result
Underlined values are outside the conditions of invention.

Figure 2:
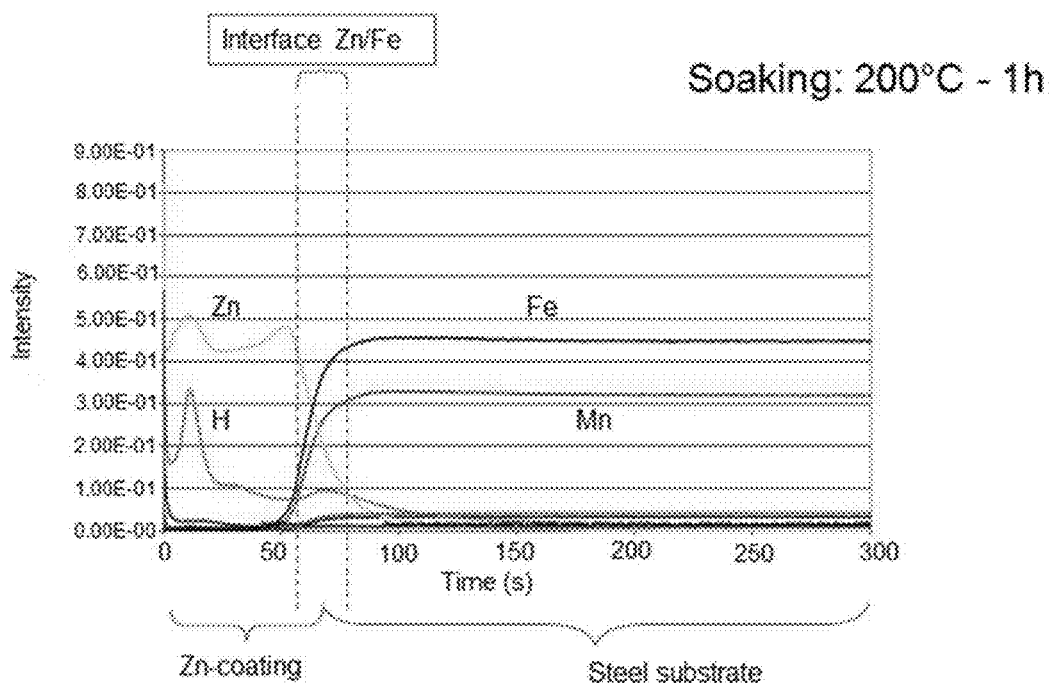
FIG. 2 illustrates the repartition of some elements: Fe, Mn, Zn, H in the coating and the substrate according to the case of FIG. 1.

Sheets in the conditions A1' to A3' show an insufficient thickness of the alloyed layer. The soaking temperature is too low in these conditions. FIG. 1 shows the example of the sheet A1' soaked at 200° C. for 1 h. No alloyed layer is present in such condition. FIG. 2 displays the repartition of Fe, Mn, Zn, H as measured by GDOES near the surface. A high intensity on FIG. 2 reveals the presence of a given element within the coating or the substrate. The hydrogen concentration is mainly localized in the coating with a significant concentration peak. While interface between the coating and the substrate is actually very sharp, it must be remarked that the GDOES technique tends to artificially smear out this interface, due to undesired emission around the crater of erosion.

Figure 3:
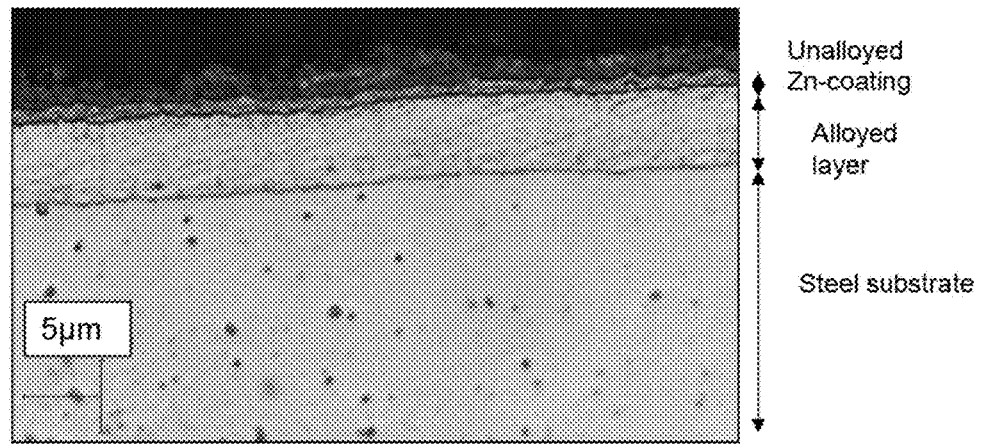
FIG. 3 illustrates a Zn-coated steel sheet whose coating characteristics are according to the invention.
Figure 4:
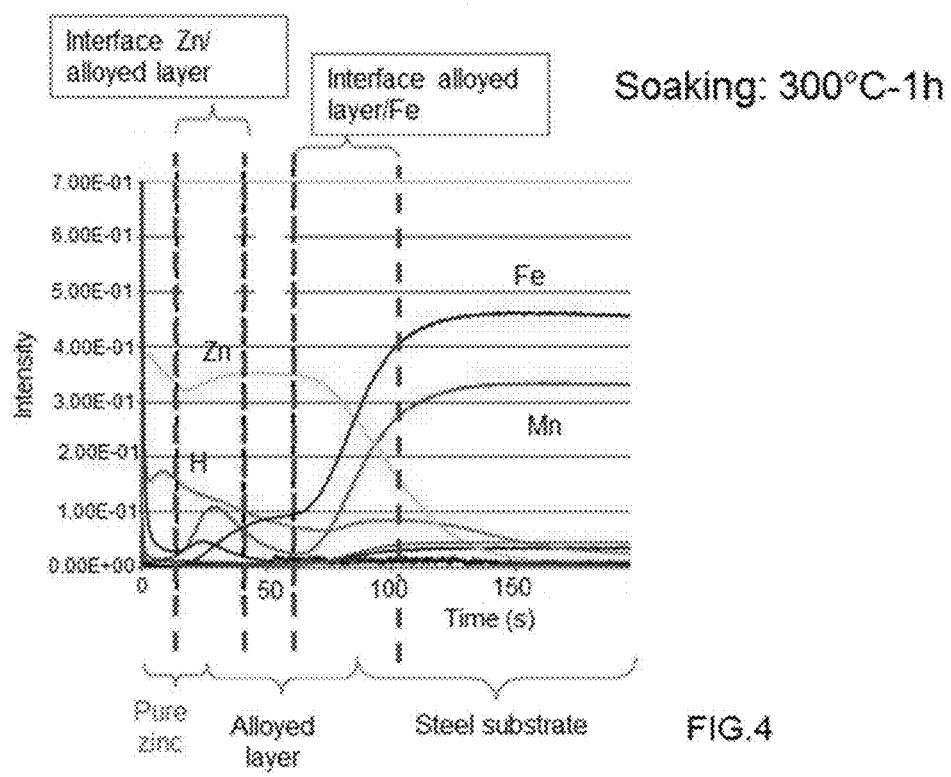
FIG. 4 illustrates the repartition of some elements: Fe, Mn, Zn, H in the coating and the substrate, according to the case of FIG. 3.

The specimens with alloyed layers thicker than 4 micrometers treated in the condition: θ(° C.)Ln(t(s))≥2450, display superior results for extremely severe test conditions. For example, FIG. 3 illustrates the example of the sheet A1' soaked at 300° C. for 1 h. The thickness of the alloyed layer, rich in iron and manganese, is greater than 5 micrometers. Hydrogen distribution, as measured by GDOES and illustrated on FIG. 4, is more uniform in the coating and the substrate, thus avoiding large hydrogen accumulation. Specimens with an alloyed layer thicker than 7 micrometers, treated in the condition: θ(° C.)Ln(t (s))≥2750, display a homogeneous hydrogen repartition in the coating layer and in the substrate.

Thus, as the presence of the alloyed layer whose thickness is superior to 1 micrometer is simple to assess by metallographic observation, the invention is a convenient means to provide coated steel sheet resistant to delayed cracking.

The steel sheets according to the invention have a UTS higher than 900 MPa and a fracture elongation of greater than 50%, conditions which are particularly suitable for cold forming and energy absorption.

The hot-rolled or cold-rolled sheets according to the invention are advantageously used in the automotive industry in the form of structural parts, reinforcing elements or external parts which, because of their very high strength and ductility, reduce effectively the weight of vehicles while increasing safety in the event of an impact.

What is claimed is:

1. An austenitic steel sheet excellent in resistance to delayed cracking, the composition of said steel comprising, in weight:
0.35%≤C≤1.05%
15%≤Mn≤26%
Si≤3%
Al≤0.050%
S≤0.030%
P≤0.080%
N≤0.1%, and
at least one metallic element X chosen among vanadium, titanium, niobium, molybdenum, chromium
0.050%≤V≤0.50%,
0.040%≤Ti≤0.50%
0.070%≤Nb≤0.50%
0.14%≤Mo≤2%
0.070%≤Cr≤2%
a remainder being iron and unavoidable impurities inherent to fabrication, including hydrogen, a quantity $X_p$ of said at least one metallic element under a form of carbides, nitrides or carbonitrides being, in weight:
0.030%≤$V_p$≤0.40%
0.030%≤$Ti_p$≤0.50%
0.040%≤$Nb_p$≤0.40%
0.14%≤$Mo_p$≤0.44%
0.070%≤$Cr_p$≤0.6%
a hydrogen content $H_{max}$ designating a maximal hydrogen content that can be measured from a series of at least five specimens, and the quantity $X_p$, in weight, being such that:

$$1000\frac{H_{max}}{X_P} \leq 3.3.$$

2. A steel sheet according to claim 1, wherein $$1000\frac{H_{max}}{X_P} \leq 2.5.$$

3. A steel sheet according to claim 1, wherein said sheet comprises a zinc or zinc—Y alloy coating, wherein element Y is one or more of Ni, Cr, Mg but not Fe or Mn.

4. A coated steel sheet, comprising:
a base steel sheet including at least one surface, the base steel sheet being made of a base steel having a composition comprising, in weight:
0.35%≤C≤1.05%
15%≤Mn≤26%
Si≤3%
Al≤0.050%
S≤0.030%
P≤0.080%
N≤0.1%, and
at least one metallic element X chosen among vanadium, titanium, niobium, molybdenum, chromium:
0.050%≤V≤0.50%,
0.040%≤Ti≤0.50%
0.070%≤Nb≤0.50%
0.14%≤Mo≤2%
0.070%≤Cr≤2%
a remainder being iron and unavoidable impurities inherent to fabrication, a quantity Xp of said at least one metallic element under a form of carbides, nitrides or carbonitrides being, in weight:
0.030%≤$V_p$≤0.40%
0.030%≤$Ti_p$≤0.50%
0.040%≤$Nb_p$≤0.40%
0.14%≤$Mo_p$≤0.44%
0.070%≤$Cr_p$≤0.6%
a zinc or zinc—Y alloy coating, wherein element Y is one or more of Ni, Cr, Mg but not Fe or Mn, a thickness of said coating being less or equal to 50 micrometers; and
an iron and manganese rich-Zn alloyed layer at an interface between the base steel sheet and the zinc or zinc-Y alloy layer, the iron and manganese rich-Zn alloyed layer containing at least 6%Fe and at least 1.7%Mn, a thickness of the alloyed layer being greater than or equal to 1 micrometer, the alloyed layer contacting the at least one surface of the base steel sheet.

5. A steel sheet according to claim 4, wherein the thickness of said alloyed layer is greater than or equal to 4 micrometers.

6. Steel sheet according to claim 4, wherein the thickness of said alloyed layer is greater than or equal to 7 micrometers.

7. A coated steel sheet comprising:
a base steel sheet including at least one surface, the base steel sheet being made of a base steel having a composition comprising, in weight:
0.35%≤C≤1.05%
15%≤Mn≤26%
Si≤3%
Al≤0.050%
S≤0.030%
P≤0.080%
N≤0.1%,
at least one metallic element X chosen among vanadium, titanium, niobium, molybdenum, chromium:
0.050%≤V≤0.50%,
0.040%≤Ti≤0.50%
0.070%≤Nb≤0.50%
0.14%≤Mo≤2%
0.070%≤Cr≤2%
and optionally, one or several elements chosen among:
0.0005%≤B≤0.010%
Ni≤2%
Cu≤5%, and as a remainder iron and unavoidable impurities inherent to fabrication, a quantity Xp of said at least one metallic element under a form of carbides, nitrides or carbonitrides being, in weight:

0.030%≤$V_p$≤0.40%
0.030%≤$Ti_p$≤0.50%
0.040%≤$Nb_p$≤0.40%
0.14%≤$Mo_p$≤0.44%
0.070%≤$Cr_p$≤0.6% a zinc or zinc—Y alloy coating on the base steel sheet, wherein element Y is one or more of Cr and Mg but not Fe or Mn; and a metallic coating layer at an interface between the base steel sheet and the zinc or zinc-Y alloy layer, the metallic coating layer contacting the at least one surface of the base steel sheet, the metallic coating layer acting as a hydrogen barrier between said base steel sheet and said zinc or zinc—Y alloy coating.

8. A steel sheet according to claim 7, wherein the metal of said metallic coating layer is chosen among Sn, Ni, Ti, Cu, W, or Al, or alloys based on these said metals.

9. A steel sheet according to claim 7, wherein said metallic coating layer has a thickness between 0.1 and 1 micrometer.

10. A steel sheet according to claim 1, wherein said composition comprises, in weight 0.35%≤C≤0.50%.

11. A steel sheet according to claim 1, wherein said composition comprises, in weight 0.50%<C≤0.70%.

12. A steel sheet according to claim 1, wherein said composition comprises, in weight 0.70%<C≤1.05%.

13. A steel sheet according to claim 10, wherein said composition comprises, in weight 17%≤Mn≤24%.

14. A steel sheet according to claim 11, wherein said composition comprises, in weight 17%≤Mn≤24%.

15. A steel sheet according to claim 12, wherein said composition comprises, in weight 16%≤Mn≤19%.

16. A steel sheet according to claim 1, wherein said composition comprises 0.070%≤V≤0.40%, vanadium $V_p$ under the form of precipitated carbides, nitrides, carbonitrides, being 0.070%≤$V_p$≤0.140%.

17. A steel sheet according to claim 1, wherein said composition comprises 0.060%≤$Ti_p$≤0.40%, titanium $Ti_p$ under the form of precipitated carbides, nitrides, carbonitrides, being 0.060%≤$Ti_p$≤0.110%.

18. A steel sheet according to claim 1, wherein said composition comprises 0.090%≤Nb≤0.40%, niobium $Nb_p$ under the form of precipitated carbides, nitrides, carbonitrides, being 0.090%≤$Nb_p$≤0.200%.

19. A steel sheet according to claim 1, wherein said composition comprises 0.20%≤Mo≤1.8%, molybdenum $Mo_p$ under the form of carbides being 0.20%≤$Mo_p$<0.35%.

20. A steel sheet according to claim 1, wherein a mean size $\bar{d}$ of said carbides, nitrides, carbonitrides is comprised between 7 and 20 nanometers.

21. A steel sheet according to claim 1, wherein at least 75% of said carbides, nitrides, carbonitrides, is located in intragranular position.

22. A steel sheet according to claim 1 further comprising at least one element chosen among
0.0005%≤B≤0.010%;
Ni≤2%; and
Cu≤5%.

23. A steel sheet according to claim 4 further comprising at least one element chosen among
0.0005%≤B≤0.010%;
Ni≤2%; and
Cu≤5%.

* * * * *